(12) United States Patent
Qi

(10) Patent No.: US 11,979,018 B2
(45) Date of Patent: May 7, 2024

(54) METHOD FOR OVER CURRENT PROTECTION DEVICE, AND POWER SUPPLY CIRCUIT

(71) Applicant: INSPUR SUZHOU INTELLIGENT TECHNOLOGY CO., LTD., Jiangsu (CN)

(72) Inventor: Xuebao Qi, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/278,839

(22) PCT Filed: Jan. 28, 2022

(86) PCT No.: PCT/CN2022/074610
§ 371 (c)(1),
(2) Date: Aug. 24, 2023

(87) PCT Pub. No.: WO2023/045201
PCT Pub. Date: Mar. 30, 2023

(65) Prior Publication Data
US 2024/0088644 A1 Mar. 14, 2024

(30) Foreign Application Priority Data
Sep. 23, 2021 (CN) ............. 202111110675.8

(51) Int. Cl.
*H02H 7/12* (2006.01)
*H02M 1/32* (2007.01)
(52) U.S. Cl.
CPC ......... *H02H 7/1213* (2013.01); *H02M 1/32* (2013.01)

(58) Field of Classification Search
CPC ............. H02H 7/1213; H02M 1/32
See application file for complete search history.

(56) References Cited

U.S. PATENT DOCUMENTS

| | | | |
|---|---|---|---|
| 10,998,722 B2* | 5/2021 | Song | H02J 1/106 |
| 2013/0100566 A1* | 4/2013 | Gong | H02H 3/093 361/87 |

(Continued)

FOREIGN PATENT DOCUMENTS

| | | |
|---|---|---|
| CN | 1407345 A | 4/2003 |
| CN | 205791499 U | 12/2016 |

(Continued)

*Primary Examiner* — Jue Zhang
(74) *Attorney, Agent, or Firm* — IPro, PLLC

(57) ABSTRACT

A method for over current protection includes: when receiving an overcurrent signal that representing an output current of DC-DC conversion module exceeds a OCP value sent by a DC-DC conversion module, controlling a protection module to be disconnected, cutting off an external insertion apparatus, so that the on-board circuit is not powered off; keeping outputting a first enable signal to the DC-DC conversion module within third preset duration longer than first preset duration, and after the first preset duration, determining whether the overcurrent signal sent by the DC-DC conversion module is re-received; if yes, it indicates that overcurrent occurs in the on-board circuit portion, controlling the DC-DC conversion module to be turned off, to stop supplying power for the on-board circuit; if no, keeping controlling the protection module to be disconnected, and continuing to merely supply power to the on-board circuit.

20 Claims, 4 Drawing Sheets

(56) References Cited

U.S. PATENT DOCUMENTS

2015/0288166 A1* 10/2015 Chen .................... H02H 7/1213
                                                                                     361/94
2016/0315541 A1* 10/2016 Chen .................... H02H 7/1213

FOREIGN PATENT DOCUMENTS

| CN | 106371539 A | 2/2017 |
| CN | 109917893 A | 6/2019 |
| CN | 112068687 A | 12/2020 |
| CN | 113572126 A | 10/2021 |
| JP | 2000308340 A | 11/2000 |
| JP | 2007215348 A | 8/2007 |

* cited by examiner

METHOD FOR OVER CURRENT PROTECTION DEVICE, AND POWER SUPPLY CIRCUIT

The present application claims the priority of the Chinese patent application filed on Sep. 23, 2021 before the Chinese Patent Office with the application number of 202111110675.8 and the title of "METHOD FOR OVER CURRENT PROTECTION, DEVICE AND POWER SUPPLY CIRCUIT", which is incorporated herein in its entirety by reference.

TECHNICAL FIELD

The present application relates to the field of circuit protection and, more particularly, to a method for overcurrent protection, device and power supply circuit.

BACKGROUND

In the existing power supply control technology, a direct current power supply is converted via a Direct Current-Direct Current (DC-DC) conversion module to supply power to an on-board circuit and an external insertion apparatus. In order to realize overcurrent protection for the on-board circuit and the power supply in the process of supplying power, the DC-DC conversion module itself is provided with an overcurrent protection mechanism of current. That is, when the output current value of the DC-DC conversion module exceeds its Over Current Protection (OCP, current overcurrent protection) value, the OCP protection of the DC-DC conversion module is triggered, to stop supplying power to the on-board circuit and the external insertion apparatus.

The OCP protection of the DC-DC conversion module will cause the on-board circuit to be powered off. In order that the power supply of the on-board circuit is not affected by the access of the external insertion apparatus, a protection module is connected in series in the power supply branch circuit where the external insertion apparatus is located. After the current of this power supply branch circuit exceeds an overcurrent protection threshold of the protection module for a certain duration, this power supply branch circuit is disconnected, and so that the probability that the DC-DC conversion module will trigger the OCP protection due to the external insertion apparatus is accessed to the external insertion interface is reduced. However, in practical applications, in order to satisfy the communication requirements, the types of external insertion apparatuses connected to the external insertion interface are various, which include an external insertion apparatus with a capacitive load, and at the moment when it is accessed by means of the external insertion interface, the instantaneous spike current value may exceed the OCP value, triggering the protection of the DC-DC conversion module. Furthermore, since the maintenance time of the instantaneous spike current value is very short, which is longer than the response time of the protection of the DC-DC conversion module, and is also shorter than the response time of the protection of the protection module provided in the branch circuit where the external insertion apparatus is located. Consequently, it is highly possible that, before the protection module is triggered or the protection module acts, the protection of the DC-DC conversion module has already been triggered, causing the on-board circuit to be powered off, and accordingly causing that a server crashes or cannot to be started, and so that the power supply reliability of the on-board circuit is affected.

SUMMARY

The purpose of the present application is to provide a method for overcurrent protection, device and power supply circuit, which solve the problem that, the access of an external insertion device with a capacitive load is easy to cause the on-board circuit to be powered off, causing that a server crashes or cannot be started, and the power supply reliability of the on-board circuit is improved.

In order to solve the above-mentioned technical problem, the present application provides an overcurrent protection method, wherein the method is applied to a processor of a power supply circuit, and the power supply circuit further includes a DC-DC conversion module, a protection module and an external insertion interface;

the DC-DC conversion module is respectively connected to an on-board circuit, the processor and the protection module, and is configured for supplying power to the on-board circuit, and by means of the protection module, supplying power to an external insertion apparatus connected to the external insertion interface, and when an output current of the DC-DC conversion module itself exceeds an OCP value, switching off the output of the DC-DC conversion module itself and, after a first preset duration, resuming the output current of the DC-DC conversion module itself;

the protection module is connected to the external insertion apparatus by means of the external insertion interface, and is configured for being disconnected, after a current of a power supply branch circuit of the protection module itself exceeds an overcurrent protection threshold for a second preset duration; and the method for overcurrent protection method includes:

when receiving an overcurrent signal that, representing the output current of the DC-DC conversion module exceeds the OCP value sent by the DC-DC conversion module, controlling the protection module to be disconnected;

keeping outputting a first enable signal to the DC-DC conversion module within a third preset duration, wherein the third preset duration is longer than the first preset duration;

after the first preset duration, judging whether the overcurrent signal that, representing the output current of the DC-DC conversion module exceeds the OCP value sent by the DC-DC conversion module is re-received;

when the overcurrent signal that, representing the output current of the DC-DC conversion module exceeds the OCP value sent by the DC-DC conversion module is re-received, controlling the DC-DC conversion module to be turned off; and when the overcurrent signal that, representing the output current of the DC-DC conversion module exceeds the OCP value sent by the DC-DC conversion module is not re-received, keeping controlling the protection module to be disconnected.

According to an embodiment of the present application, before the step of, keeping controlling the protection module to be disconnect, the method further includes:

S11: judging whether a number of times i the protection module is controlled to be closed is N; when the number of times i the protection module is controlled to be closed is N, proceeding to S12; and when the number of times the protection module is controlled to be closed is not N, proceeding to S13, wherein N is an integer not less than 2, and i is an integer not greater than N;

S12: proceeding to the step of, keeping controlling the protection module to be disconnected, and resetting i to be zero;

S13: controlling the protection module to be closed, and making i=i+1;

S14: judging whether the overcurrent signal that, representing the output current of the DC-DC conversion module exceeds the OCP value sent by the DC-DC conversion module is re-received; when the overcurrent signal that, representing the output current of the DC-DC conversion module exceeds the OCP value sent by the DC-DC conversion module is re-received, proceeding to S15; and, when the overcurrent signal that, representing the output current of the DC-DC conversion module exceeds the OCP value sent by the DC-DC conversion module is not re-received, proceeding to S17;

S15: controlling the protection module to be disconnected;

S16: keeping outputting the first enable signal to the DC-DC conversion module within the third preset duration, and proceeding to S11, wherein the third preset duration is longer than the first preset duration; and S17: keeping controlling the protection module to be closed, and resetting i to be zero.

According to an embodiment of the present application, after the step of, keeping controlling the protection module to be closed, the method further includes:

saving a result that the power supply circuit does not have an overcurrent into a memory.

According to an embodiment of the present application, after determining the number of times i the protection module is controlled to be closed is equal to N, the method further includes:

saving a result that the power supply circuit has an overcurrent into a memory.

According to an embodiment of the present application, the overcurrent protection method further includes:

when the protection module is disconnected, after the current of the power supply branch circuit where the protection module itself is located exceeds an overcurrent protection threshold for the second preset duration, receiving an overcurrent protection signal sent by the protection module, and storing the overcurrent protection signal into a memory.

According to an embodiment of the present application, an OCP value regulation pin of the DC-DC conversion module is connected to an initial resistor;

the power supply circuit further includes:

a regulatable resistor connected to the OCP value regulation pin of the DC-DC conversion module; and the DC-DC conversion module is further configured for, based on the initial resistor and the regulatable resistor, determining the OCP value.

According to an embodiment of the present application, the regulatable resistor includes a first controllable switch and a first regulation resistor;

one end of the first regulated resistor is connected to the OCP value regulation pin of the DC-DC conversion module, and the other end of the first regulation resistor is connected to a first end of the first controllable switch;

a second end of the first controllable switch is grounded, and a control end of the first controllable switch is connected to the external insertion interface, and is configured for being switched on when the external insertion apparatus is accessed to the external insertion interface; and an equivalent resistance of the first regulation resistor and the initial resistor is negatively correlated with the OCP value.

According to an embodiment of the present application, the regulatable resistor includes a second controllable switch and a second regulation resistor;

one end of the second regulation resistor is connected to the OCP value regulation pin of the DC-DC conversion module, and the other end of the second regulation resistor is connected to a first end of the second controllable switch;

a resistance value of an equivalent resistance of the second regulation resistor and the initial resistor is negatively correlated with a magnitude of the OCP value;

a second end of the second controllable switch is grounded, and a control end of the second controllable switch is connected to an OCP value regulation pin of the processor; and the overcurrent protection method further includes:

when receiving a switch switch-on instruction, sending a second enable signal to the second controllable switch, to control the second controllable switch to be switched on.

According to an embodiment of the present application, the third preset duration is greater than the first preset duration, so that the DC-DC conversion module keeps supplying power to the on-board circuit.

In order to solve the above technical problem, the present application further provides a device for overcurrent protection, wherein the device includes:

a memory, configured for storing a computer program; and a processor configured for, when executing the computer program, the steps of the overcurrent protection method stated above are implemented.

In order to solve the above technical problem, the present application further provides a power supply circuit, wherein the power supply circuit includes a DC-DC conversion module, a protection module and an external insertion interface, and further includes the device for overcurrent protection stated above;

the DC-DC conversion module is respectively connected to an on-board circuit, the processor and the protection module, and is configured for supplying power to the on-board circuit, and by means of the protection module, supplying power to an external insertion apparatus connected to the external insertion interface, and when an output current of the DC-DC conversion module itself exceeds an OCP value, switching off the output of the DC-DC conversion module itself and, after a first preset duration, resuming the output of the DC-DC conversion module; and the protection module is connected to the external insertion apparatus by the external insertion interface, and is configured for being disconnected after an electric current of a power supply branch circuit of the protection module itself exceeds an overcurrent protection threshold for a second preset duration.

The present application provides a method for overcurrent protection, device and power supply circuit. According to the present application, when receiving the overcurrent signal that, representing the output current of the DC-DC conversion module exceeds the OCP value sent by the DC-DC, the DC-DC conversion module is not immediately controlled to stop operating, but firstly, controlling the protection module to be disconnected, and the external insertion apparatus is cut off, so that the on-board circuit is not powered off. Subsequently, within the third preset duration longer than the first preset duration, keeping outputting the first enable signal to the DC-DC conversion module, to maintain the power supply to the on-board circuit. Furthermore, after the first preset duration, judging whether the overcurrent signal that, representing the output current of the DC-DC conversion module exceeds the OCP value sent by the DC-DC conversion module is re-received. When the overcurrent signal that, representing the output current of the DC-DC conversion module exceeds the OCP value sent by the DC-DC conversion module is re-received, that indicates the on-board circuit portion has an overcurrent, and therefore controlling the DC-DC conversion module to be turned off, to stop supplying power to the on-board circuit. When the overcurrent signal that, representing the output current of the DC-DC conversion module exceeds the OCP value sent by the DC-DC conversion module is not re-received, keeping controlling the protection module to be disconnected, and continuing to merely supply power to the on-board circuit. This solution solves the problem that the access of an external insertion apparatus with a capacitive load is easy to cause the on-board circuit to be powered off, thereby causing that a server crashes or may not be started, and the power supply reliability of the on-board circuit is improved.

BRIEF DESCRIPTION OF THE DRAWINGS

In order to more clearly illustrate the technical solutions of the embodiments of the present application, the figures that are required to describe the prior art and the embodiments will be briefly described below. Apparently, the figures that are described below are merely embodiments of the present application, and a person skilled in the art can obtain other figures according to these figures without paying creative work.

DETAILED DESCRIPTION

The core of the present application is to provide a method for overcurrent protection, device and power supply circuit, which solve the problem that, the access of an external insertion apparatus with a capacitive load is easy to cause the on-board circuit to be powered off, thereby causing that a server crashed or may not be started, and the power supply reliability of the on-board circuit is improved.

In order to make the objects, the technical solutions and the advantages of the embodiments of the present application more clearly, the technical solutions according to the embodiments of the present application will be clearly and completely described below with reference to the drawings according to the embodiments of the present application. Apparently, the described embodiments are merely certain embodiments of the present application, rather than all of the embodiments. All of the other embodiments that a person skilled in the art obtains on the basis of the embodiments of the present application without paying creative work will fall within the protection scope of the present application.

Figure 1:
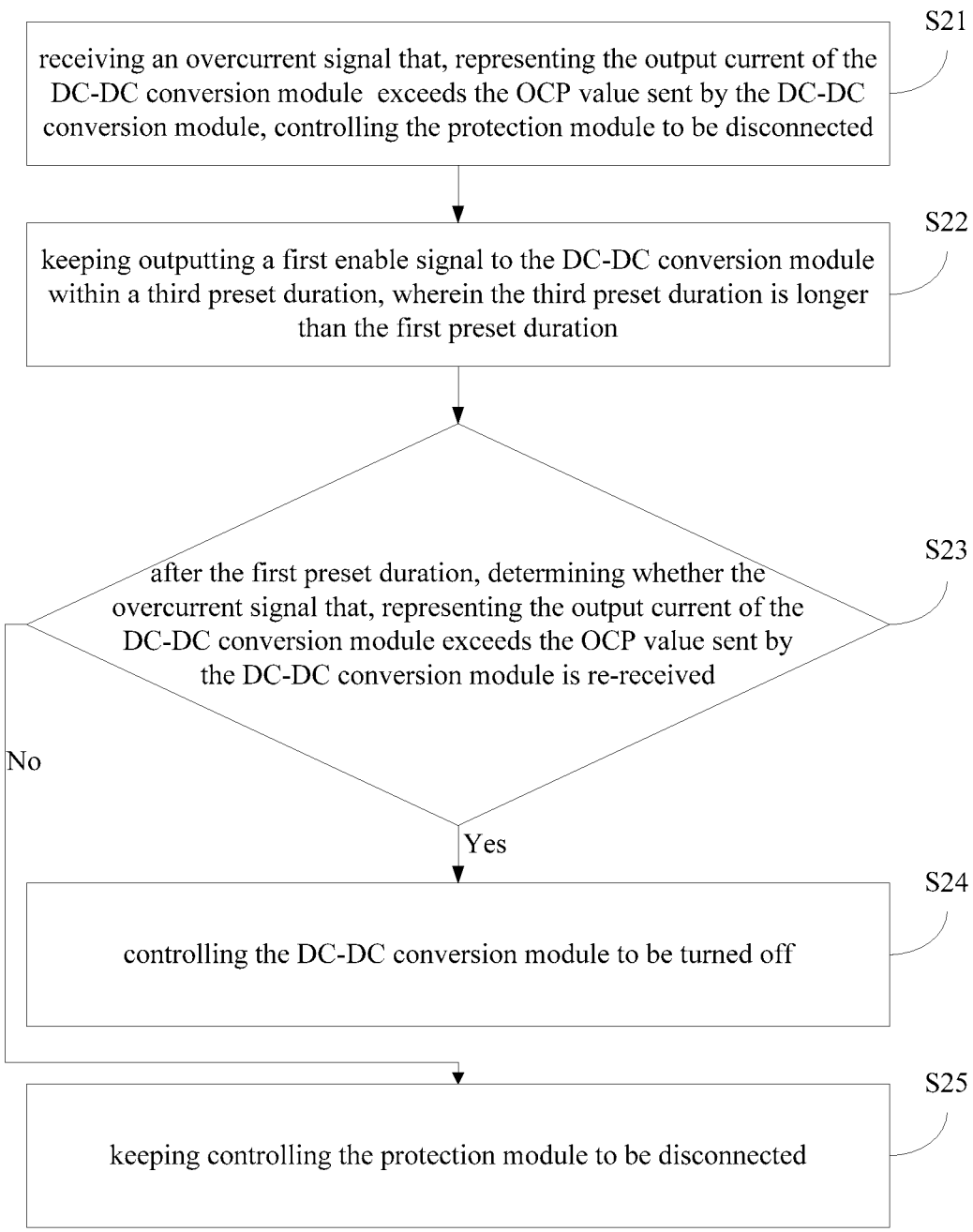
FIG. 1 is a flowchart of a method for overcurrent protection according to the present application.
Figure 2:
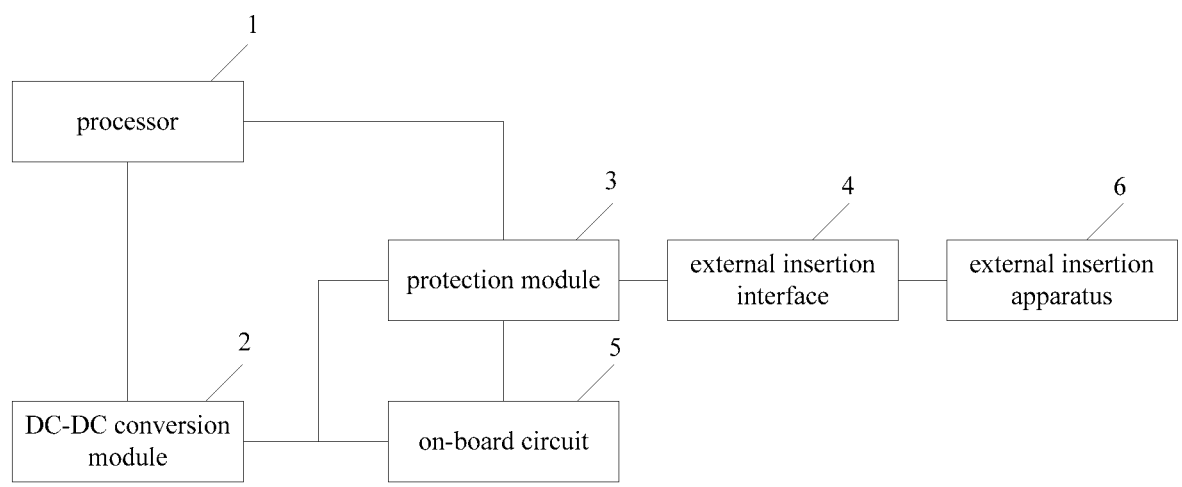
FIG. 2 is a structural schematic diagram of a power supply circuit according to the present application.

Please refer to FIGS. 1 and 2, FIG. 1 is a flowchart of a method for overcurrent protection according to the present application, and FIG. 2 is a structural schematic diagram of a power supply circuit according to the present application.

The method for overcurrent protection is applied to a processor 1 of a power supply circuit. The power supply circuit further includes a DC-DC conversion module 2, a protection module 3 and an external insertion interface 4. The DC-DC conversion module 2 is respectively connected to an on-board circuit 5, the processor 1 and the protection module 3, and is configured for supplying power to the on-board circuit 5, and by means of the protection module 3, supplying power to an external insertion apparatus 6 connected to the external insertion interface 4, and when an output current of the DC-DC conversion module itself exceeds an OCP value, switching off the output of the DC-DC conversion module 2 itself and, after a first preset duration, resuming the output current of the DC-DC conversion module 2 itself. The protection module 3 is connected to the external insertion apparatus 6 by means of the external insertion interface 4, and is configured for being disconnected after a current of a power supply branch circuit of the protection module itself exceeds an overcurrent protection threshold for a second preset duration.

The method for overcurrent-protection includes:

S21: When receiving an overcurrent signal that, representing the output current of the DC-DC conversion module 2 exceeds the OCP value sent by the DC-DC conversion module 2, controlling the protection module 3 to be disconnected.

S22: Keeping outputting a first enable signal to the DC-DC conversion module 2 within a third preset duration, wherein the third preset duration is longer than the first preset duration.

S23: After the first preset duration, judging whether the overcurrent signal that, representing the output current of the DC-DC conversion module 2 exceeds the OCP value sent by the DC-DC conversion module 2 is re-received; when the overcurrent signal that, representing the output current of the DC-DC conversion module 2 exceeds the OCP value sent by the DC-DC conversion module 2 is re-received, proceeding to S24; and when the overcurrent signal that, representing that the output current of the DC-DC conversion module 2 exceeds the OCP value sent by the DC-DC conversion module 2 is not re-received, proceeding to S25.

S24: Controlling the DC-DC conversion module 2 to be turned off

S25: Keeping controlling the protection module 3 to be disconnected.

In the present application, considering that in the prior art, when the external insertion apparatus 6 is a capacitive load, at the moment it is accessed by means of the external insertion interface 4, an instantaneous spike current with a very short maintenance time will be generated. The maintenance time is longer than the response time of the OCP protection of the DC-DC conversion module 2, and is also shorter than the response time of the protection of the protection module 3 provided in the branch circuit where the external insertion apparatus 6 is located. Consequently, it is highly possible that, before the protection module 3 is triggered or the protection module 3 acts, the OCP protection of the DC-DC conversion module 2 has already been triggered, causing that the on-board circuit 5 to be powered off, and the server crashes or may not be started, and so that the reliability of the power supply of the on-board circuit 5 is affected.

In order to solve the above-mentioned technical problem, according to the present application, after a capacitive external insertion apparatus 6 is accessed, when the overcurrent signal that, representing the output current of the DC-DC conversion module 2 exceeds the OCP value sent by the DC-DC conversion module 2 is received, that indicates the output current of the DC-DC conversion module 2 is overcurrent, which triggers the OCP protection of the DC-DC conversion module 2. At this point, the processor 1 does not immediately send a turn-off signal to the DC-DC conversion module 2 to switch off the output of the DC-DC conversion module 2 as in the prior art, but firstly, controls the protection module 3 to be disconnected, to cut off the power supply of the external insertion apparatus 6, and preferentially keeps the power supply of the on-board circuit 5. Subsequently, the processor 1, within the third preset duration, keeps outputting the first enable signal to the DC-DC conversion module 2, wherein the third preset duration is longer than the first preset duration. The first enable signal herein may be a signal that is capable to realize enabling the DC-DC conversion module 2, for example, a level signal of high-level and the like, which is not limited herein in the present application, and is determined according to an actual circuit structure. After the first preset duration, determining whether the overcurrent signal that, representing the output current of the DC-DC conversion module 2 exceeds the OCP value sent by the DC-DC conversion module 2 is re-received. When the overcurrent signal that, representing the output current of the DC-DC conversion module 2 exceeds the OCP value sent by the DC-DC conversion module 2 is re-received, that indicates the on-board circuit 5 portion has an overcurrent, and therefore controlling the DC-DC conversion module 2 to be turned off, to stop supplying power to the on-board circuit 5. When the overcurrent signal that, representing the output current of the DC-DC conversion module 2 exceeds the OCP value sent by the DC-DC conversion module 2 is not re-received, that indicates the reason why the DC-DC conversion module 2 triggers the OCP protection this time is that, the outputted current value of the DC-DC conversion module 2, which caused by an instantaneous spike current generated at the moment when the external insertion apparatus 6 is accessed, is too large. Consequently, keeping controlling the protection module 3 to be disconnected, and merely, maintaining the power supply to the on-board circuit 5.

The way of realizing controlling the protection module 3 to be disconnected may be that the processor 1 outputs a first turn-off signal to the protection module 3, wherein the first turn-off signal herein may be a level signal of low-level, which is not limited herein in the present application. The way of realizing controlling the DC-DC conversion module 2 to be turned off may be that, the processor 1 outputs a second turn-off signal to the DC-DC conversion module 2, wherein the second turn-off signal herein may be a level signal of low-level, which is not limited herein in the present application, and is determined according to the practical circuit structure.

It should be noted that, after the DC-DC conversion module 2 itself triggers the OCP protection, its outputted voltage will not immediately decrease to 0, but has a drop process. In this case, when the second turn-off signal of the processor 1 is not received, the output will be attempted again after the first preset duration. Furthermore, since the first preset duration is very short, within the first preset duration, the voltage outputted by the DC-DC conversion module 2 during the drop process may still capable of maintaining the power supply of the on-board circuit 5.

It should also be noted that, the first preset duration refers to a period for automatically resuming the output when the second turn-off signal sent by the processor 1 is not received, after the DC-DC conversion module 2 triggers the OCP protection. In the present application, considering that, when the reason why the DC-DC conversion module 2 triggers the OCP protection this time is merely, the overcurrent caused by the access of the external insertion apparatus 6, to ensure that the DC-DC conversion module 2 is capable to output normally after the first preset duration, the first enable signal for the third preset duration longer than the first preset duration will be kept to output to the DC-DC conversion module 2.

In addition, the processor 1 herein may include but is not limited to a Complex Programmable Logic Device (CPLD). The overcurrent signal representing that the output current of the DC-DC conversion module 2 exceeds the OCP value herein may be an output voltage drop signal of the DC-DC conversion module 2, which is not limited herein in the present application. The protection module 3 herein may be a protection module 3 provided based on a Metal-Oxide-Semiconductor Field-Effect Transistor (MOSFET), and may also be a protection module 3 provided based on an Electric Programming Fuse (Efuse), which is not limited herein in the present application.

In conclusion, the present application provides a method for overcurrent protection. When the overcurrent signal representing that the output current of the DC-DC conversion module 2 exceeds the OCP value sent by the DC-DC conversion module 2 is received, the DC-DC conversion module 2 is not immediately controlled to stop operating, but firstly, controlling the protection module 3 to be disconnected, to cut off the external insertion apparatus 6, and so that the on-board circuit 5 is not powered off. Subsequently, within the third preset duration longer than the first preset duration, keeping outputting the first enable signal to the DC-DC conversion module 2, to maintain the power supply to the on-board circuit 5. Furthermore, after the first preset duration, judging whether the overcurrent signal representing that the output current of the DC-DC conversion module 2 exceeds the OCP value sent by the DC-DC conversion module 2 is re-received. When the overcurrent signal representing that the output current of the DC-DC conversion module 2 exceeds the OCP value sent by the DC-DC conversion module 2 is re-received, that indicates the on-board circuit 5 portion has an overcurrent, and therefore the DC-DC conversion module 2 is controlled to be turned off, to stop supplying power to the on-board circuit 5. When the overcurrent signal representing that, the output current of the DC-DC conversion module 2 exceeds the OCP value sent by the DC-DC conversion module 2 is not re-received, keeping controlling the protection module 3 to be disconnected, and continuing to merely supply power to the on-board circuit 5. The solution solves the problem that the access of a capacitive external insertion apparatus 6 easily causes powering off of the on-board circuit 5, thereby causing that a server crashes or may not be started, and so that the reliability of the power supply of the on-board circuit 5 is improved.

Figure 3:
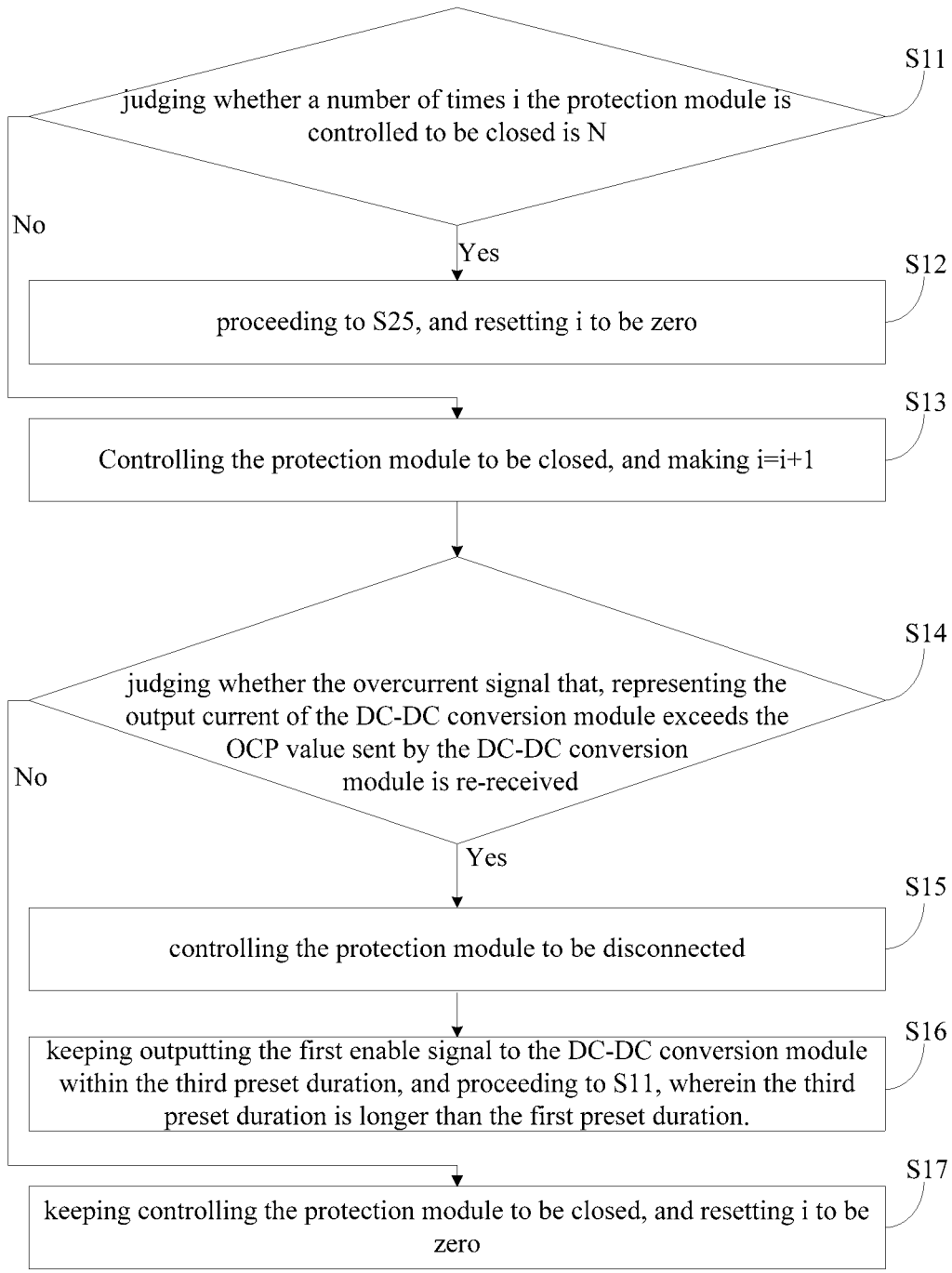
FIG. 3 is a flowchart of another overcurrent protection method according to the present application.

On the basis of the above-mentioned embodiments:

Please refer to FIG. 3, FIG. 3 is a flowchart of another method for overcurrent protection according to the present application.

As an alternative embodiment, before the step of, keeping controlling the protection module 3 to be disconnected, the method further includes:

S11: Judging whether a number of times i the protection module 3 is controlled to be closed is N; when the number of times i the protection module 3 is controlled to be closed is N, proceeding to S12; and when the number of times i the protection module 3 is controlled to be closed is not N, proceeding to S13, wherein N is an integer not less than 2, and i is an integer not greater than N.

S12: Proceeding to S25, and resetting i to be zero.

S13: Controlling the protection module 3 to be closed, and making i=i+1.

S14: Judging whether the overcurrent signal that, representing the output current of the DC-DC conversion module 2 exceeds the OCP value sent by the DC-DC conversion module 2 is re-received; when the overcurrent signal that, representing the output current of the DC-DC conversion module 2 exceeds the OCP value sent by the DC-DC conversion module 2 is re-received, proceeding to S15; and when the overcurrent signal that, representing the output current of the DC-DC conversion module 2 exceeds the OCP value sent by the DC-DC conversion module 2 is not re-received, proceeding to S17.

S15: Controlling the protection module to be disconnected.

S16: Keeping outputting the first enable signal to the DC-DC conversion module 2 within the third preset duration, and proceeding to S11, wherein the third preset duration is longer than the first preset duration.

S17: Keeping controlling the protection module 3 to be closed, and resetting i to be zero.

In the present application, under the premise of, the on-board circuit 5 is normally operated is ensured, to ensure to the largest extent that, the capacitive external insertion apparatus 6 is capable to be smoothly accessed, before the step of, keeping controlling the protection module 3 to be disconnected, firstly, judging whether the number of times qi the protection module 3 is controlled to be closed is N. When the number of times i the protection module 3 is controlled to be closed is N, indicates that, the external insertion apparatus 6 may not be smoothly accessed to a server within an acceptable time range, and therefore proceeding to S25, and resetting i to be zero, to prepare for being used in the next time of counting. When the number of times i the protection module 3 is controlled to be closed is not N, continuing to attempt to access the external insertion apparatus 6, and controlling the protection module 3 to be closed, and making i=i+1, so that the DC-DC conversion module 2 charges the external insertion apparatus 6. Subsequently, judging whether the overcurrent signal that, representing the output current of the DC-DC conversion module 2 exceeds the OCP value sent by the DC-DC conversion module 2 is re-received. When the overcurrent signal that, representing the output current of the DC-DC conversion module 2 exceeds the OCP value sent by the DC-DC conversion module 2 is re-received, that indicates the access of the external insertion apparatus 6 triggers the OCP protection of the DC-DC conversion module 2 again, and therefore firstly, controlling the protection module 3 to be disconnected, within the third preset duration longer than the first preset duration, keeping outputting the first enable signal to the DC-DC conversion module 2, to resume the normal output of the DC-DC conversion module 2, and the process is returned to the step S11. When the overcurrent signal that, representing the output current of the DC-DC conversion module 2 exceeds the OCP value sent by the DC-DC conversion module 2 is not re-received, that indicates the external insertion apparatus 6 has already been smoothly accessed, and the DC-DC conversion module 2 may realize supplying power to the external insertion apparatus 6, and therefore keeping controlling the protection module 3 to be closed, and resetting i to be zero, to prepare for being used in the next time of counting.

The N herein refers to a threshold of a number of times of charge that is pre-stored in the memory, and the magnitude of the numerical value of the N is not limited herein in the present application, and is determined according to actual requirements.

It may be seen that, by this way, the one-time of charge process of the capacitive external insertion apparatus 6 may be split into multi-times of charge processes, and when preferentially keeping the power supply of the on-board circuit 5, it is guaranteed that, to the largest extent, the capacitive external insertion apparatus 6 may be smoothly accessed. Furthermore, by regulating the magnitude of the N, this way may support the access of some external insertion apparatuses 6 that, may generate a large instantaneous spike current at the moment of access.

As an alternative embodiment, after the step of, keeping controlling the protection module 3 to be closed, the method further includes:

saving a result that the power supply circuit does not have an overcurrent into a memory.

In the present application, in order to record a charge result of, charging the external insertion apparatus 6 for multiple times after the external insertion apparatus 6 is accessed, by the processor 1, after keeping controlling the protection module 3 to be closed, that indicates, at this point, the external insertion apparatus 6 has already been normally accessed, and saving the result that the power supply circuit does not have an overcurrent into the memory. It may be seen that, this method is capable to record a charge result that the external insertion apparatus 6 is capable to be normally accessed after multiple times of charging after the external insertion apparatus 6 is accessed, so that facilitating subsequently viewing of a user.

As an alternative embodiment, after judging that the number of times i the protection module 3 is controlled to be closed is equal to N, the method further includes:

saving a result that the power supply circuit has an overcurrent into a memory.

In the present application, in order to acquire the charge result of multiple times of charging of the external insertion apparatus 6 after the external insertion apparatus 6 being accessed, so as to perform a further action, by the processor 1, when judging the number of times i the protection module 3 is controlled to be closed is equal to N, that indicates the external insertion apparatus 6 may not be normally accessed, and saving the result that the power supply circuit has an overcurrent into a memory, so as to perform a further action.

In addition, the further action herein may be to prompt a user to pull out the external insertion apparatus 6, which is not limited herein in the present application.

It may be seen that, by means of this method, the result that, the external insertion apparatus 6 may not be normally accessed, which will cause the overcurrent of the power supply circuit, may be recorded, to facilitate the subsequent further action of the processor 1.

As an alternative embodiment, the method for overcurrent protection further includes:

when the protection module 3 is disconnected after the current of the power supply branch circuit where the protection module 3 itself is located exceeds an overcurrent protection threshold for the second preset duration, receiving an overcurrent protection signal sent by the protection module 3, and storing the overcurrent protection signal into a memory.

In the present embodiment, in order to acquire the protection action of the protection module 3, so as to adopt other protection measures subsequently according to requirements, by the protection module 3, when being disconnected due to the current of the power supply branch circuit where it is located exceeds the overcurrent protection threshold for the second preset duration, will send an overcurrent protection signal to the processor 1, and by the processor 1, after receiving the second protection signal, storing it into the memory, to record the protection event of the protection module 3 of this time.

In addition, the overcurrent protection signal herein may be a signal that is capable to represent an overcurrent protection event occurs at the protection module, for example, a level signal of high-level and the like, which is not limited herein in the present application.

It may be seen that, in such a way, the record of the protection event of the protection module may be realized, and facilitates further protection measures being adopted subsequently according to requirements.

Figure 4:
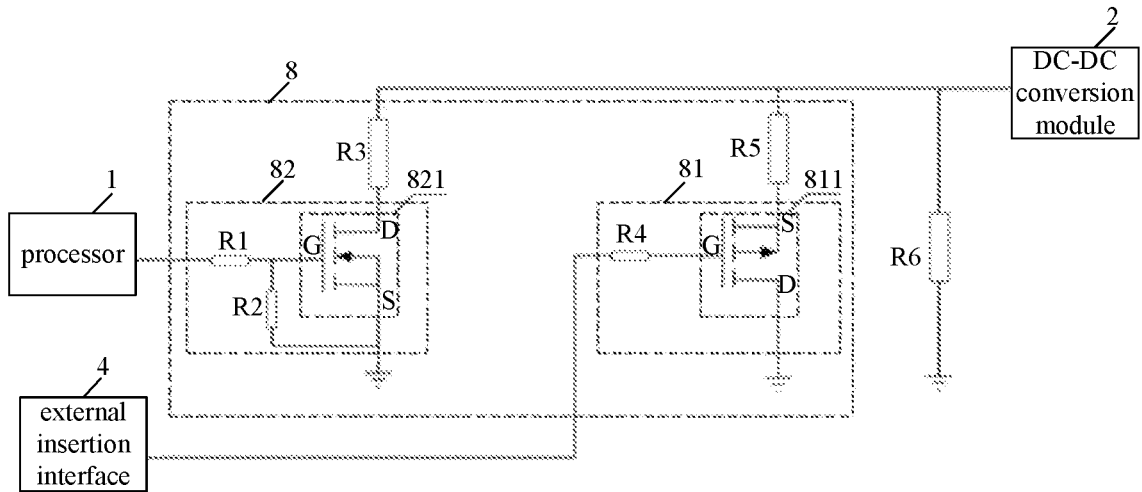
FIG. 4 is a structural schematic diagram of another power supply circuit according to the present application.

Please refer to FIG. 4, FIG. 4 is a structural schematic diagram of another power supply circuit according to the present application.

As an alternative embodiment, an OCP value regulation pin of the DC-DC conversion module 2 is connected to an initial resistor R6;

The power supply circuit further includes:
a regulatable resistor 8 connected to the OCP value regulation pin of the DC-DC conversion module 2; and
the DC-DC conversion module 2 is further configured for, based on the initial resistor R6 and the regulatable resistor 8, determining the OCP value.

In the present embodiment, considering the case that, when the external insertion apparatus 6 is accessed, the protection of the protection module 3 is not triggered, and merely the OCP protection of the DC-DC conversion module 2 is triggered, so that the OCP value of the DC-DC protection module 3 may be increased, and so that the DC-DC conversion module 2 may continue to supply power to the external insertion apparatus 6 and the on-board circuit 5. In the prior art, in order to increase the OCP value of the DC-DC protection module 3, the power supply circuit is returned to the factory to replace the initial resistor R6 connected to the OCP value regulation pin of the DC-DC conversion module 2. However, this method is complicated to operate, and is inconvenient for a user to use, and the return-factory adjustment brings additional logistics cost to the user. Furthermore, for power supply circuits of some large-scale servers, it is highly possible that, this method of return-factory adjustment will not be realized. In order to solve the above-mentioned technical problem, in the present application, the power supply circuit is further provided with a regulatable resistor 8 connected to the OCP value regulation pin of the DC-DC conversion module 2, so that based on the initial resistor R6 and the regulatable resistor 8, the DC-DC conversion module 2 may determine the OCP value.

It should be noted that, the equivalent resistance of the regulatable resistor 8 and the initial resistor R6 herein may be used for increasing the OCP value of the DC-DC conversion module, and may also be used for decreasing the OCP value of the DC-DC conversion module 2, which is not limited herein in the present application, and is determined according to the actual requirements of a user.

It may be seen that, by this way, in the case that it is required to regulate the OCP value of the DC-DC conversion module 2, it is not necessary to return the power supply circuit to the factory, to regulate the resistance value of the initial resistor R6 and, merely based on the initial resistor R6 and the regulatable resistor 8, the OCP value of the DC-DC conversion module 2 may be regulated according to the actual requirements of a user. Furthermore, this method is simple to be implemented, and is convenient for a user to operate, and has high applicability and practical applicability.

As an alternative embodiment, the regulatable resistor 8 includes a first controllable switch 81 and a first regulation resistor R5. One end of the first regulation resistor R5 is connected to the OCP value regulation pin of the DC-DC conversion module 2, and the other end of the first regulation resistor R5 is connected to a first end of the first controllable switch 81.

A second end of the first controllable switch 81 is grounded, and a control end of the first controllable switch 81 is connected to the external insertion interface 4, and is configured for being switched on when the external insertion apparatus 6 is accessed to the external insertion interface 4.

An equivalent resistance of the first regulation resistor R5 and the initial resistor R6 is negatively correlated with the OCP value.

In the present embodiment, considering the case that, when the external insertion apparatus 6 is accessed, the protection of the protection module 3 is not triggered, and merely the OCP protection of the DC-DC conversion module 2 is triggered, and the OCP value of the DC-DC protection module 3 may be increased, so that the DC-DC conversion module 2 may continue to supply power to the external insertion apparatus 6 and the on-board circuit 5. In order to self-adaptively increase the OCP value, the regulatable resistor 8 may be configured to include a first controllable switch 81 and a first regulation resistor R5, wherein the equivalent resistance of the first regulation resistor R5 and the initial resistor R6 is negatively correlated with the OCP value. When no external insertion apparatus 6 is accessed to the external insertion interface 4, the first controllable switch 81 is disconnected, and the first regulation resistor R5 does not access, in this case, the resistance value of the equivalent resistance is the resistance value of the initial resistor R6. When the external insertion apparatus 6 is accessed to the external insertion interface 4, the first controllable switch 81 is switched on, to cause the first regulation resistor R5 to be accessed, in this case, the resistance value of the equivalent resistance is the equivalent resistance that after the first regulation resistor R5 and the initial resistor R6 are connected in parallel, which is less than the resistance value of the equivalent resistance when no external insertion apparatus 6 is accessed to the external insertion interface 4, and so that the OCP value of the DC-DC conversion module 2 is increased.

It should be noted that, the first controllable switch 81 herein may be any controllable switch device, for example, a Metal-Oxide-Semiconductor Field-Effect Transistor (MOSFET) and the like, which is not limited herein in the present application, and is determined according to actual requirements. When the first controllable switch 81 includes the Positive Channel Metal Oxide Semiconductor (PMOS, P-channel MOSFET) 811 as shown in FIG. 4, in this case, the source of the PMOS 811 serves as the first end of the first controllable switch 81, the drain of the PMOS 811 serves as the second end of the first controllable switch 81, the grid of the PMOS 811 serves as the control end of the first controllable switch 81, when the external insertion apparatus 6 is accessed to the external insertion interface 4, the PMOS 811 is switched on. In addition, in order to prevent an excessively large current flowing through the grid of the PMOS 811 from burning out this device, a first current limiting resistor R4 may be provided in the branch circuit where the grid of the PMOS 811 is located, which is not limited herein in the present application.

It may be seen that, by this way, the OCP value of the DC-DC conversion module 2 may be self-adaptively increased when the external insertion apparatus 6 is accessed to the external insertion interface 4, so that the probability of triggering the OCP protection of the DC-DC conversion module 2 is reduced. Furthermore, this method is simple and easy to be implemented, and has a high degree of automation.

As an alternative embodiment, the regulatable resistor 8 includes a second controllable switch 82 and a second regulation resistor R3. One end of the second regulation resistor R3 is connected to the OCP value regulation pin of the DC-DC conversion module 2, and the other end of the second regulation resistor R3 is connected to a first end of the second controllable switch 82. A resistance value of the equivalent resistance of the second regulation resistor R3 and the initial resistor R6 is negatively correlated with the magnitude of the OCP value. A second end of the second controllable switch 82 is grounded, and a control end of the second controllable switch 82 is connected to an OCP value regulation pin of the processor 1.

The method for overcurrent protection further includes:
when receiving a switch switch-on instruction, sending a second enable signal to the second controllable switch 82, to control the second controllable switch 82 to be switched on.

In the present embodiment, considering the case that, when the external insertion apparatus 6 is accessed, the protection of the protection module 3 is not triggered, and merely the OCP protection of the DC-DC conversion module 2 is triggered, the OCP value of the DC-DC protection module 3 may be increased, and so that the DC-DC conversion module 2 may continue to supply power to the external insertion apparatus 6 and the on-board circuit 5. In order to increase the OCP value, the regulatable resistor 8 may be configured to include a second controllable switch 82 and a second regulation resistor R3, wherein the equivalent resistance of the second regulation resistor R3 and the initial resistor R6 is negatively correlated with the OCP value.

When the processor 1 does not receive the switch switching-on instruction, the second controllable switch 82 is disconnected, and the second regulation resistor R3 is not accessed, in this case, the resistance value of the equivalent resistance is the resistance value of the initial resistor R6. By the processor 1, when receiving the switch switch-on instruction, sending the second enable signal to the second controllable switch 82, to control the second controllable switch 82 to be switched on, and the second regulation resistor R3 is accessed, in this case, the resistance value of the equivalent resistance is the equivalent resistance that after the second regulation resistor R3 and the initial resistor R6 are connected in parallel, wherein the resistance value of this equivalent resistance, is less than the resistance value of the equivalent resistance when the processor 1 does not receive the switch-on instruction of the switch, so that the OCP value of the DC-DC conversion module 2 is increased.

It should be noted that, the switch switch-on instruction herein, may be a switch switch-on instruction that is sent to the processor 1 by a user according to actual requirements by pressing a regulation key, which is not limited herein in the present application.

It should also be noted that, the second controllable switch 82 herein may be any controllable switch device, for example, a MOSFET and the like, which is not limited herein in the present application, and is determined according to actual requirements. When the second controllable switch 82 includes a Negative Channel Metal Oxide Semiconductor (NMOS, N-channel MOSFET) 821 as shown in FIG. 4, in this case, the drain of the NMOS 821 serves as the first end of the second controllable switch 82, the source of the NMOS 821 serves as the second end of the second controllable switch 82, the grid of the NMOS 821 serves as the control end of the second controllable switch 82, and the NMOS 821 is switched on when its grid receives the second enable signal sent by the processor 1. Of course, to prevent an excessively large current flowing via the grid of the NMOS 821 from burning out this device, a second current limiting resistor R1 may be provided in the branch circuit where the grid of the NMOS 821 is located. In addition, to realize the voltage clamp between the grid and the source of the NMOS 821, to ensure that, the normal operation of the NMOS 821, and the electric charges stored in the grid of the NMOS 821 is discharged timely to avoid the NMOS 821 from being damaged due to misoperation, a clamp resistor R2 may be provided between the grid and the source of the NMOS 821, which is not limited herein in the present application.

It may be seen that, by this way, the OCP value of the DC-DC conversion module 2 may be increased when the switch-on instruction of the switch is received, and the probability the OCP protection of the DC-DC conversion module 2 is triggered is reduced. Furthermore, the method is simple and easy to be implemented, and is convenient for a user to use.

Figure 5:
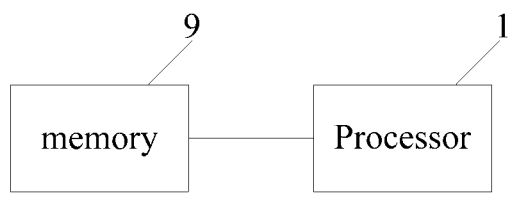
FIG. 5 is a structural schematic diagram of an overcurrent protection device according to the present application.

Please refer to FIG. 5, FIG. 5 is a structural schematic diagram of a device for overcurrent protection according to the present application.

The device for overcurrent protection includes:
a memory 9, configured for storing a computer program; and
a processor 1 configured for, when executing the computer program, the steps of the method for overcurrent protection stated above are implemented.

The description about the device for overcurrent protection according to the present application may refer to the above-mentioned embodiments of the method for overcurrent protection, and is not discussed further herein.

Figure 6:
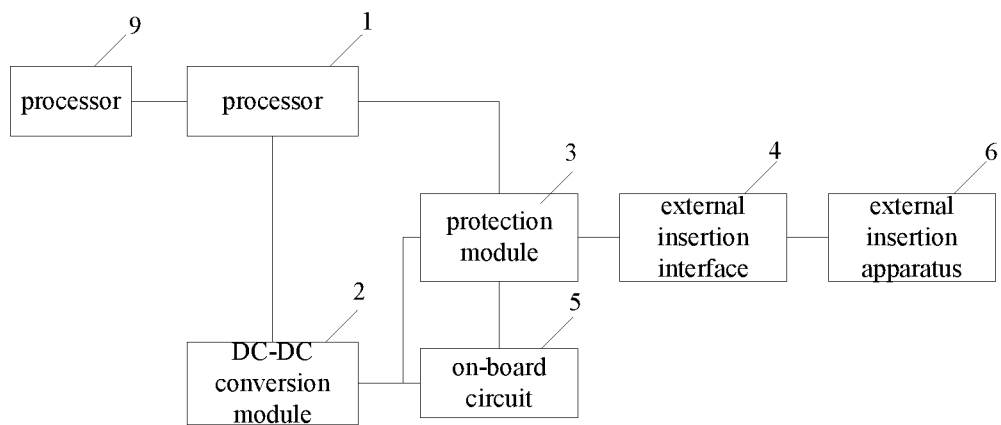
FIG. 6 is a structural schematic diagram of another power supply circuit according to the present application.

Please refer to FIG. 6, FIG. 6 is a structural schematic diagram of another power supply circuit according to the present application.

The power supply circuit includes a DC-DC conversion module 2, a protection module 3 and an external insertion interface 4, and further includes the device for overcurrent protection 10 stated above.

The DC-DC conversion module 2 is respectively connected to an on-board circuit 5, the processor 1 and the protection module 3, and is configured for supplying power to the on-board circuit 5, and by means of the protection module, supplying power to an external insertion apparatus 6 connected to the external insertion interface 4, and when an outputted current of the DC-DC conversion module itself exceeds an OCP value, an output of the DC-DC conversion module itself is switched off and, after a first preset duration, the output of the DC-DC conversion module is resumed. The protection module 3 is connected to the external insertion apparatus 6 by the external insertion interface 4, and is configured for being disconnected after an electric current of a power supply branch circuit of the protection module itself exceeds an overcurrent protection threshold for a second preset duration.

The description on the power supply circuit according to the present application may refer to the above-mentioned embodiments of the method for overcurrent protection, and is not discussed further herein.

The embodiments of the description are described in a way of progression, each of the embodiments emphatically describes the differences from the other embodiments, and the same or similar portions of the embodiments may refer to each other. Regarding the disclosed device according to the embodiments, because it corresponds to the disclosed method according to the embodiments, the description is relatively simple, and the relevant points may refer to the description about the methods.

It should also be noted that, in the description, relation terms such as first and second are merely intended to distinguish one entity or operation from another entity or operation, and that does not necessarily require or imply that these entities or operations have therebetween any such actual relation or order. Furthermore, the terms "include", "comprise" or any variants thereof are intended to cover non-exclusive inclusions, so that processes, methods, objects or devices that include a series of elements do not merely include those elements, but also include other elements that are not explicitly listed, or include the elements that are inherent to such processes, methods, objects or devices. Unless further limitation is set forth, an element defined by the wording "including a . . . " does not exclude additional same element in the process, method, object or device comprising the element.

The above-mentioned description on the disclosed embodiments enables a person skilled in the art to implement or use the present application. Various modifications on these embodiments will be apparent to a person skilled in the art, and the general principle defined herein may be implemented in other embodiments without departing from the spirit or scope of the present application. Therefore, the present application should not be limited to the embodiments illustrated herein, but should be accorded the broadest scope in accord with the principle and the novel characteristics disclosed herein.

The invention claimed is:

1. A method for overcurrent protection, wherein the method is applied to a processor of a power supply circuit, and the power supply circuit further comprises a DC-DC conversion module, a protection module and an external insertion interface;
   the DC-DC conversion module is respectively connected to an on-board circuit, the processor and the protection module, and is configured for supplying power to the on-board circuit, and by means of the protection module, supplying power to an external insertion device connected to the external insertion interface, and when an output current of the DC-DC conversion module itself exceeds an OCP value, switching off the output of the DC-DC conversion module itself and, after a first preset duration, resuming the output of the DC-DC conversion module itself;
   the protection module is connected to the external insertion apparatus by means of the external insertion interface, and is configured for being disconnected after a current of a power supply branch circuit of the protection module itself exceeds an overcurrent protection threshold for a second preset duration; and
   the method for overcurrent protection comprises:
   when receiving an overcurrent signal that, representing the output current of the DC-DC conversion module exceeds the OCP value sent by the DC-DC conversion module, controlling the protection module to be disconnected;
   keeping outputting a first enable signal to the DC-DC conversion module within a third preset duration, wherein the third preset duration is longer than the first preset duration;
   after the first preset duration, judging whether the overcurrent signal that, representing the output current of the DC-DC conversion module exceeds the OCP value sent by the DC-DC conversion module is re-received;
   under the condition the overcurrent signal that, representing the output current of the DC-DC conversion module exceeds the OCP value sent by the DC-DC conversion module is re-received, controlling the DC-DC conversion module to be turned off; and
   under the condition the overcurrent signal that, representing the output current of the DC-DC conversion module exceeds the OCP value sent by the DC-DC conversion module is not re-received, keeping controlling the protection module to be disconnected.

2. The method for overcurrent protection according to claim 1, wherein before the step of, keeping controlling the protection module to be disconnected, the method further comprises:
   S11: judging whether a number of times i the protection module is controlled to be closed is N; under the condition the number of times i the protection module is controlled to be closed is N, proceeding to S12; and under the condition the number of times i the protection module is controlled to be closed is not N, proceeding to S13; wherein N is an integer not less than 2, and i is an integer not greater than N;
   S12: proceeding to the step of, keeping controlling the protection module to be disconnected, and resetting i to be zero;
   S13: controlling the protection module to be closed and making i=i+1;
   S14: judging whether the overcurrent signal that, representing the output current of the DC-DC conversion module exceeds the OCP value sent by the DC-DC conversion module is re-received; under the condition the overcurrent signal that, representing the output current of the DC-DC conversion module exceeds the OCP value sent by the DC-DC conversion module is re-received, proceeding to S15; and, under the condition the overcurrent signal that, representing that the output current of the DC-DC conversion module exceeds the OCP value sent by the DC-DC conversion module is not re-received, proceeding to S17;
   S15: controlling the protection module to be disconnected;
   S16: keeping outputting the first enable signal to the DC-DC conversion module within the third preset duration, and proceeding to S11; wherein the third preset duration is longer than the first preset duration; and S17: keeping controlling the protection module to be closed, and resetting i to be zero.

3. The method for overcurrent protection according to claim 2, wherein after the step of, keeping controlling the protection module to be closed, the method further comprises:

saving a result that the power supply circuit does not have an overcurrent into a memory.

4. The method for overcurrent protection according to claim 2, wherein after judging the number of times i the protection module is controlled to be closed is equal to N, the method further comprises:

saving a result that the power supply circuit has an overcurrent into a memory.

5. The method for overcurrent protection according to claim 1, wherein the overcurrent protection method further comprises:

when the protection module is disconnected after the current of the power supply branch circuit where the protection module itself is located exceeds an overcurrent protection threshold for the second preset duration, receiving an overcurrent protection signal sent by the protection module, and storing the overcurrent protection signal into a memory.

6. The method for overcurrent protection according to claim 1, wherein an OCP value regulation pin of the DC-DC conversion module is connected to an initial resistor;

the power supply circuit further comprises:

a regulatable resistor connected to the OCP value regulation pin of the DC-DC conversion module; and the DC-DC conversion module is further configured for, based on the initial resistor and the regulatable resistor, determining the OCP value.

7. The method for overcurrent protection according to claim 6, wherein the regulatable resistor comprises a first controllable switch and a first regulation resistor;

one end of the first regulation resistor is connected to the OCP value regulation pin of the DC-DC conversion module, and the other end of the first regulation resistor is connected to a first end of the first controllable switch;

a second end of the first controllable switch is grounded, and a control end of the first controllable switch is connected to the external insertion interface, and is configured for being switched on when the external insertion apparatus is accessed to the external insertion interface; and an equivalent resistance of the first regulation resistor and the initial resistor is negatively correlated with the OCP value.

8. The method for overcurrent protection according to claim 6, wherein the regulatable resistor comprises a second controllable switch and a second regulation resistor;

one end of the second regulation resistor is connected to the OCP value regulation pin of the DC-DC conversion module, and the other end of the second regulation resistor is connected to a first end of the second controllable switch;

a resistance value of an equivalent resistance of the second regulation resistor and the initial resistor is negatively correlated with a magnitude of the OCP value;

a second end of the second controllable switch is grounded, and a control end of the second controllable switch is connected to an OCP value regulation pin of the processor; and the overcurrent-protection method further comprises:

when receiving a switch switch-on instruction, sending a second enable signal to the second controllable switch, to control the second controllable switch to be switched on.

9. The method for overcurrent protection according to claim 1, wherein the third preset duration is greater than the first preset duration, so that the DC-DC conversion module keeps supplying power to the on-board circuit.

10. A device for overcurrent protection, wherein the device comprises:

a memory, configured for storing a computer program; and a processor configured for, when executing the computer program, the steps of the overcurrent protection method according to claim 1 are implemented.

11. A power supply circuit, wherein the power supply circuit comprises a DC-DC conversion module, a protection module and an external insertion interface, and further comprises the overcurrent protection device according to claim 10;

the DC-DC conversion module is respectively connected to an on-board circuit, the processor and the protection module, and is configured for supplying power to the on-board circuit, and by means of the protection module, supplying power to an external insertion apparatus connected to the external insertion interface, and when an output current of the DC-DC conversion module itself exceeds an OCP value, an output of the DC-DC conversion module itself is switched off and, after a first preset duration, the output of the DC-DC conversion module is resumed; and the protection module is connected to the external insertion apparatus by the external insertion interface, and is configured for being disconnected after an electric current of a power supply branch circuit of the protection module itself exceeds an overcurrent protection threshold for a second preset duration.

12. The device for overcurrent protection according to claim 10, wherein before the step of, keeping controlling the protection module to be disconnected, the method further comprises:

S11: judging whether a number of times i the protection module is controlled to be closed is N; under the condition the number of times i the protection module is controlled to be closed is N, proceeding to S12; and under the condition the number of times i the protection module is controlled to be closed is not N, proceeding to S13; wherein N is an integer not less than 2, and i is an integer not greater than N;

S12: proceeding to the step of, keeping controlling the protection module to be disconnected, and resetting i to be zero;

S13: controlling the protection module to be closed and making i=i+1;

S14: judging whether the overcurrent signal that, representing the output current of the DC-DC conversion module exceeds the OCP value sent by the DC-DC conversion module is re-received; under the condition the overcurrent signal that, representing the output current of the DC-DC conversion module exceeds the OCP value sent by the DC-DC conversion module is re-received, proceeding to S15; and, under the condition the overcurrent signal that, representing that the output current of the DC-DC conversion module exceeds the OCP value sent by the DC-DC conversion module is not re-received, proceeding to S17;

S15: controlling the protection module to be disconnected;

S16: keeping outputting the first enable signal to the DC-DC conversion module within the third preset duration, and proceeding to S11; wherein the third preset duration is longer than the first preset duration; and S17: keeping controlling the protection module to be closed, and resetting i to be zero.

13. The device for overcurrent protection according to claim 12, wherein after the step of, keeping controlling the protection module to be closed, the method further comprises:
saving a result that the power supply circuit does not have an overcurrent into a memory.

14. The device for overcurrent protection according to claim 12, wherein after judging the number of times i the protection module is controlled to be closed is equal to N, the method further comprises:
saving a result that the power supply circuit has an overcurrent into a memory.

15. The device for overcurrent protection according to claim 10, wherein the overcurrent protection method further comprises:
when the protection module is disconnected after the current of the power supply branch circuit where the protection module itself is located exceeds an overcurrent protection threshold for the second preset duration, receiving an overcurrent protection signal sent by the protection module, and storing the overcurrent protection signal into a memory.

16. The device for overcurrent protection according to claim 10, wherein an OCP value regulation pin of the DC-DC conversion module is connected to an initial resistor;
the power supply circuit further comprises:
a regulatable resistor connected to the OCP value regulation pin of the DC-DC conversion module; and
the DC-DC conversion module is further configured for, based on the initial resistor and the regulatable resistor, determining the OCP value.

17. The device for overcurrent protection according to claim 16, wherein the regulatable resistor comprises a first controllable switch and a first regulation resistor;
one end of the first regulation resistor is connected to the OCP value regulation pin of the DC-DC conversion module, and the other end of the first regulation resistor is connected to a first end of the first controllable switch;
a second end of the first controllable switch is grounded, and a control end of the first controllable switch is connected to the external insertion interface, and is configured for being switched on when the external insertion apparatus is accessed to the external insertion interface; and
an equivalent resistance of the first regulation resistor and the initial resistor is negatively correlated with the OCP value.

18. The device for overcurrent protection according to claim 16, wherein the regulatable resistor comprises a second controllable switch and a second regulation resistor;
one end of the second regulation resistor is connected to the OCP value regulation pin of the DC-DC conversion module, and the other end of the second regulation resistor is connected to a first end of the second controllable switch;
a resistance value of an equivalent resistance of the second regulation resistor and the initial resistor is negatively correlated with a magnitude of the OCP value;
a second end of the second controllable switch is grounded, and a control end of the second controllable switch is connected to an OCP value regulation pin of the processor; and
the overcurrent-protection method further comprises:
when receiving a switch switch-on instruction, sending a second enable signal to the second controllable switch, to control the second controllable switch to be switched on.

19. The device for overcurrent protection according to claim 10, wherein the third preset duration is greater than the first preset duration, so that the DC-DC conversion module keeps supplying power to the on-board circuit.

20. The method for overcurrent protection according to claim 1, wherein the first enable signal is a level signal of high-level.

* * * * *